E. O. STANCLIFF.
SELF FEEDER FOR HAY PRESSES AND THRESHERS.
APPLICATION FILED SEPT. 22, 1919.

1,400,008.

Patented Dec. 13, 1921.

7 SHEETS—SHEET 1.

WITNESSES
Wynne Johnson
J. P. Schrott

INVENTOR
Edwin O. Stancliff
BY
Munn &co.
ATTORNEYS

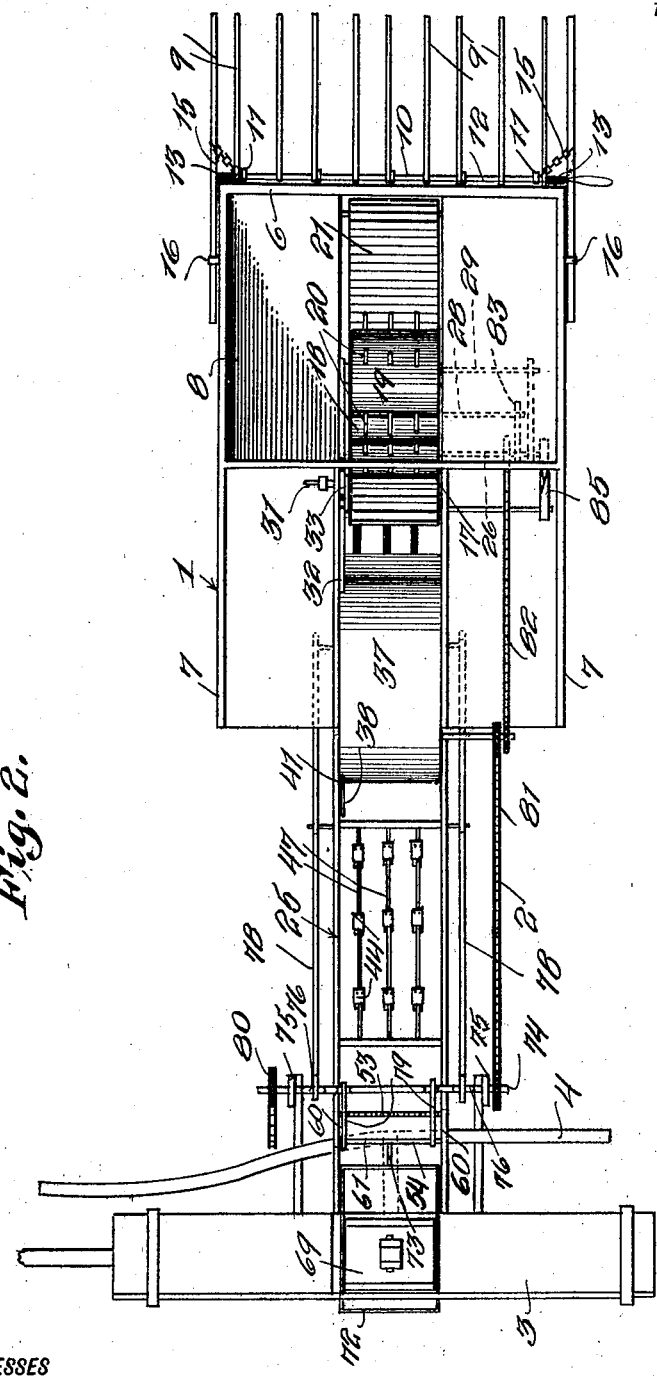

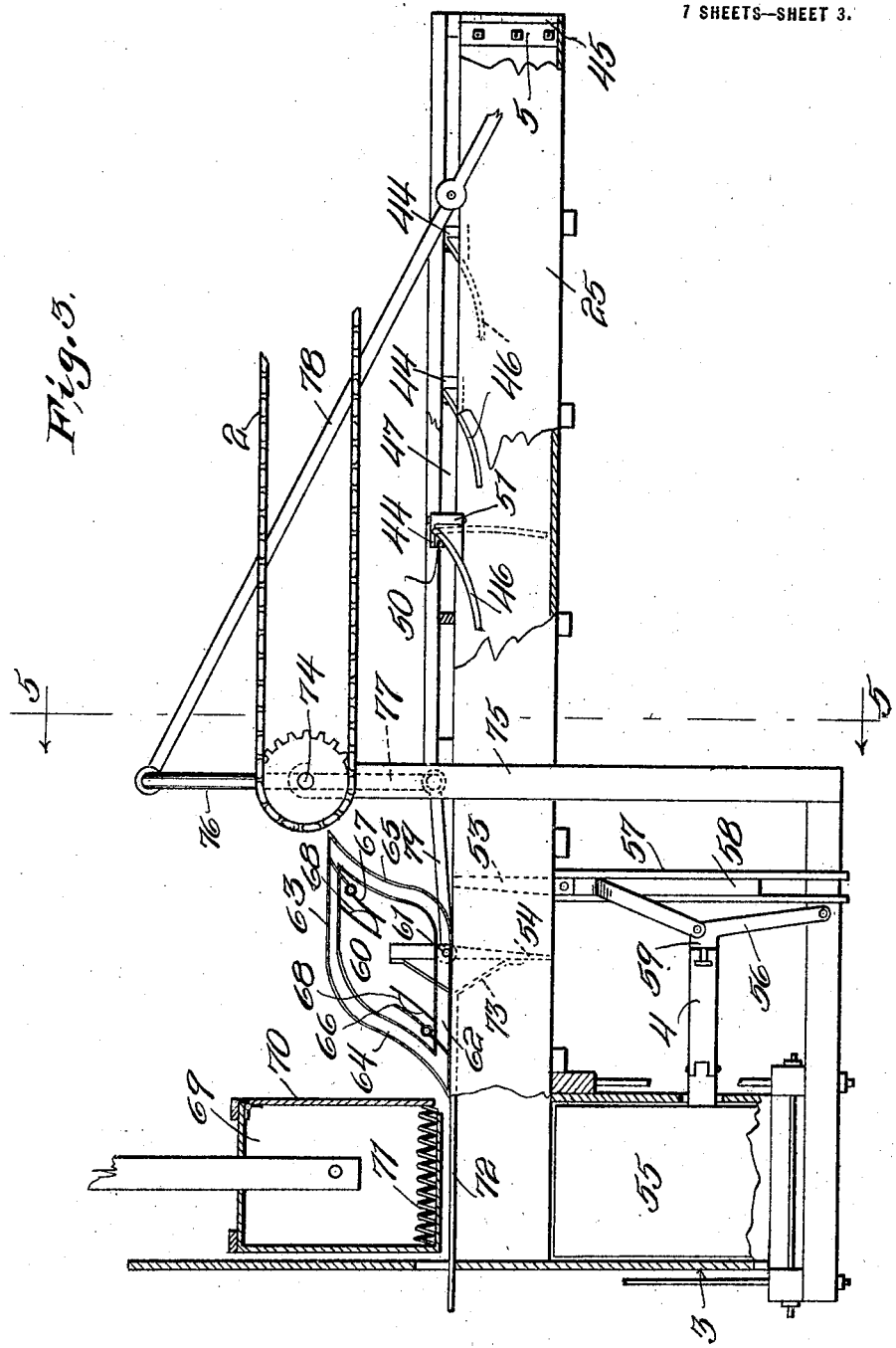

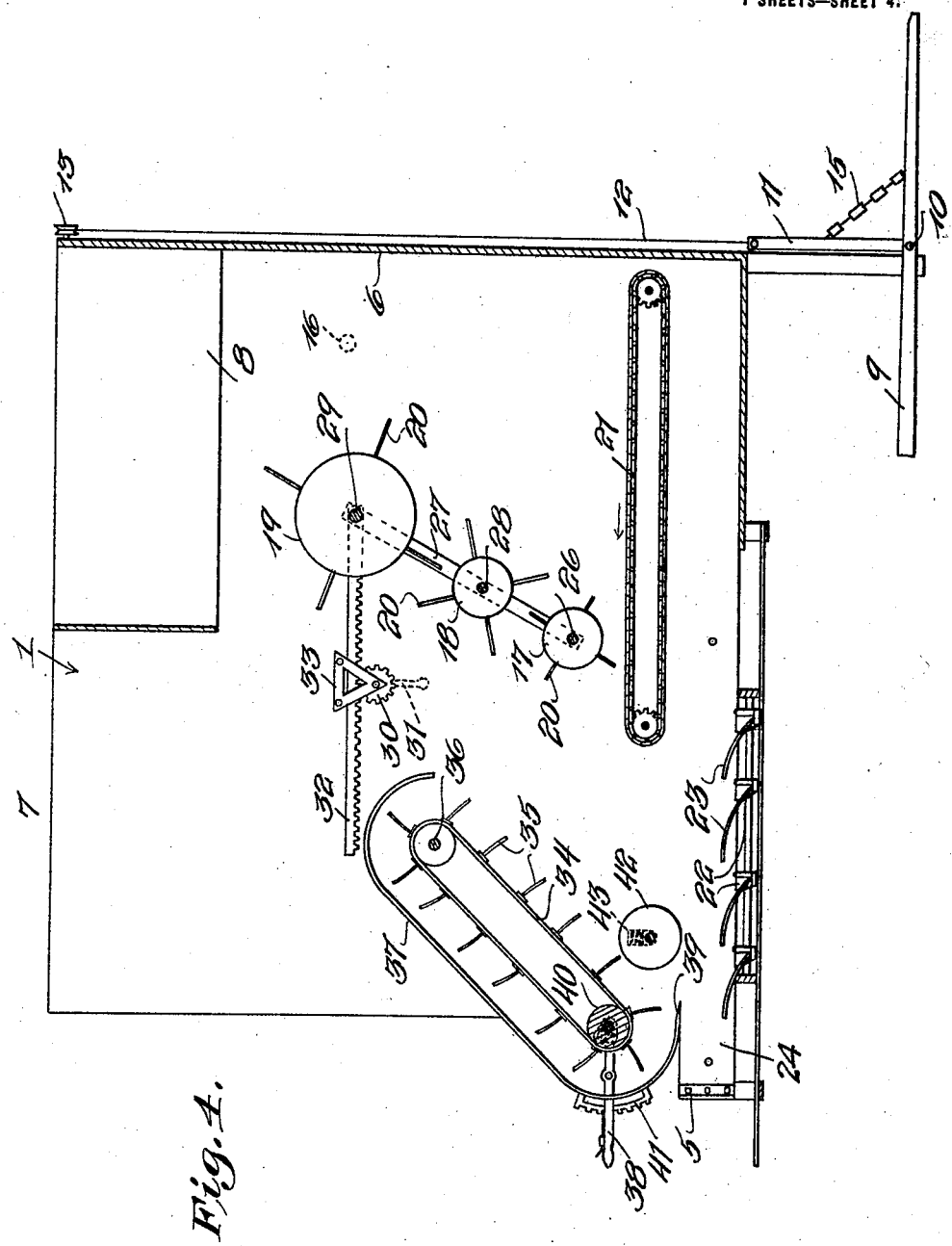

E. O. STANCLIFF.
SELF FEEDER FOR HAY PRESSES AND THRESHERS.
APPLICATION FILED SEPT. 22, 1919.
1,400,008.
Patented Dec. 13, 1921.
7 SHEETS—SHEET 5.
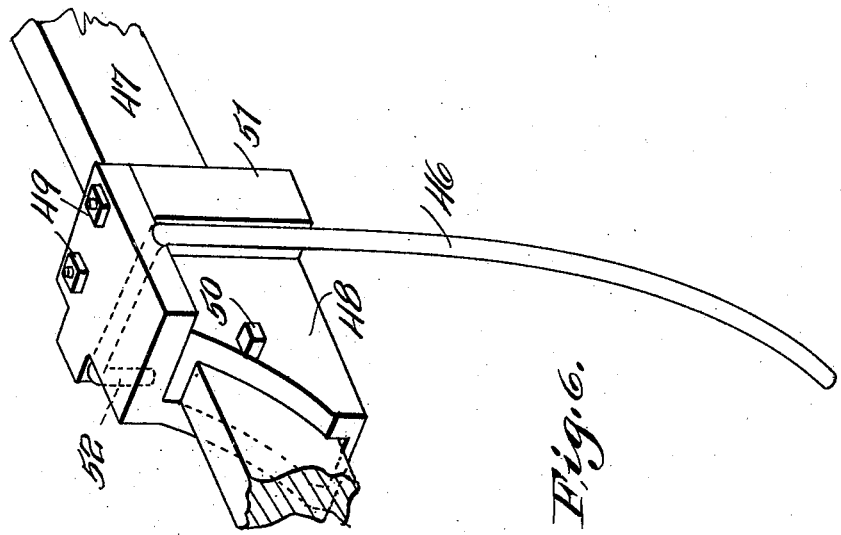
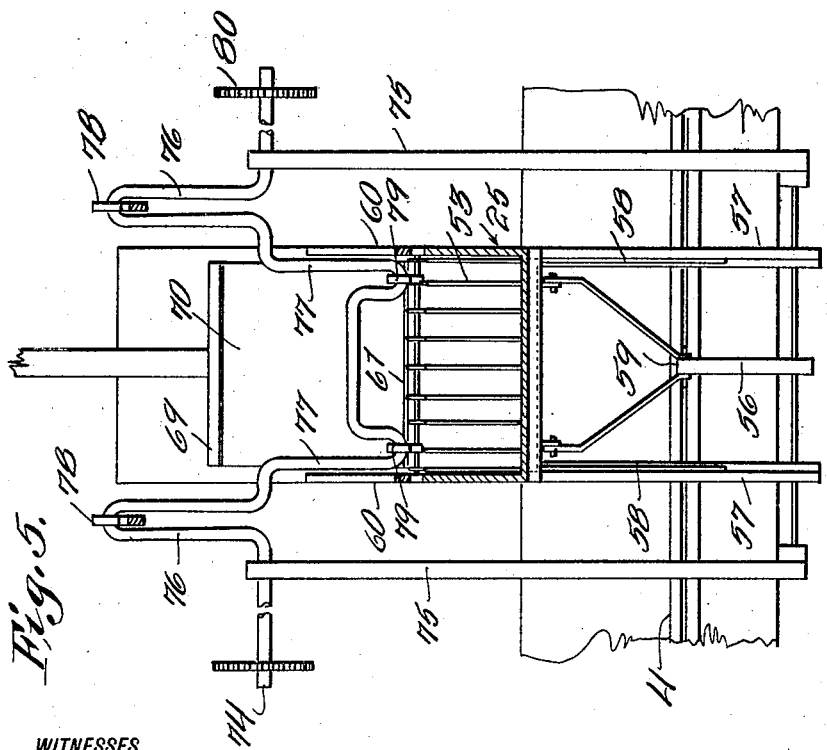
WITNESSES
Wynne Johnson
J. P. Schrott
INVENTOR
Edwin O. Stancliff
BY
ATTORNEYS

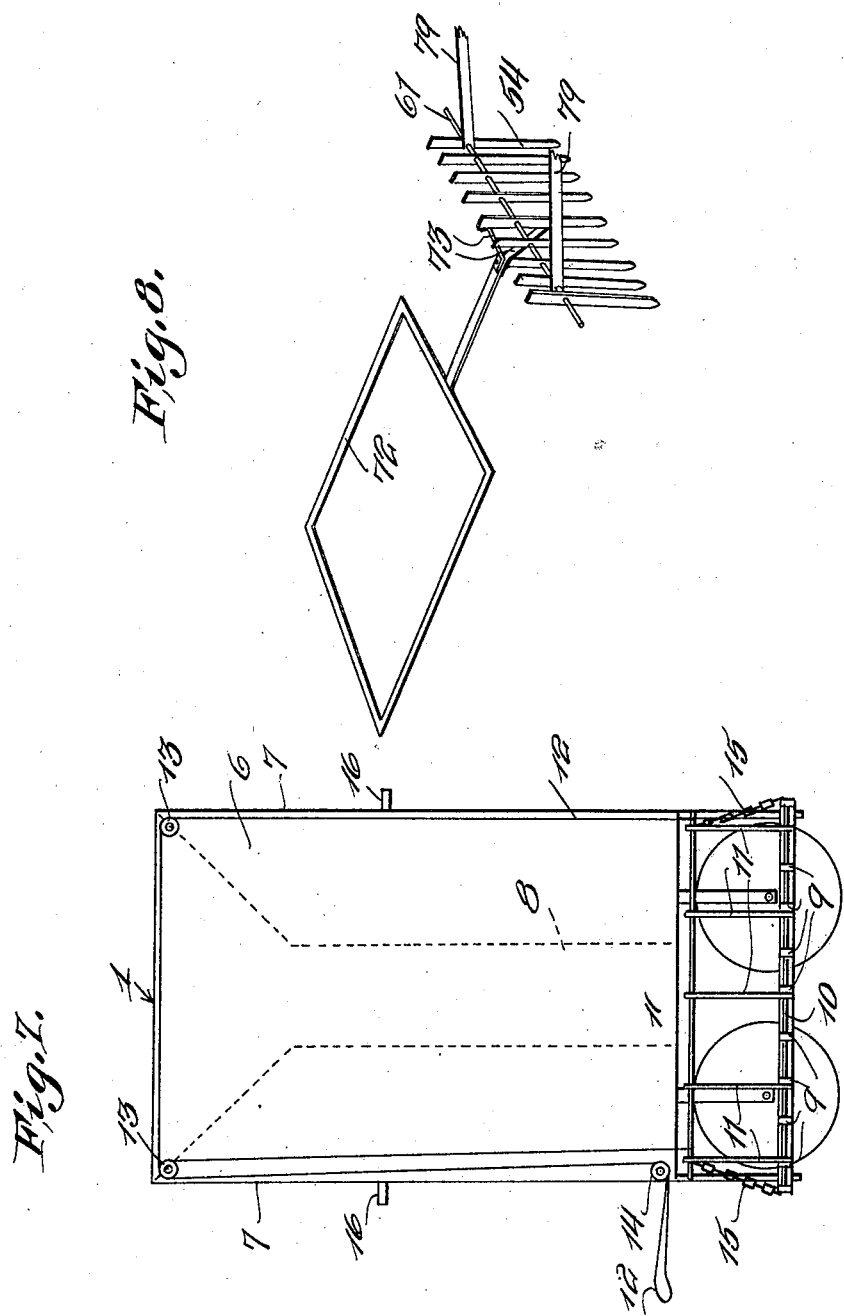

E. O. STANCLIFF.
SELF FEEDER FOR HAY PRESSES AND THRESHERS.
APPLICATION FILED SEPT. 22, 1919.

1,400,008.

Patented Dec. 13, 1921.
7 SHEETS—SHEET 7.

WITNESSES
Wynne Johnson
J. P. Schrott

INVENTOR
Edwin O. Stancliff
BY
ATTORNEYS

UNITED STATES PATENT OFFICE.

EDWIN O. STANCLIFF, OF BAKERSFIELD, CALIFORNIA.

SELF-FEEDER FOR HAY-PRESSES AND THRESHERS.

1,400,008.   Specification of Letters Patent.   Patented Dec. 13, 1921.

Application filed September 22, 1919. Serial No. 325,362.

*To all whom it may concern:*

Be it known that I, EDWIN O. STANCLIFF, a citizen of the United States, and a resident of Bakersfield, in the county of Kern and State of California, have made certain new and useful Improvements in Self-Feeders for Hay-Presses and Threshers, of which the following is a specification.

My invention relates to improvements in feeding mechanisms, it being more particularly an improved self feeder applicable to either a hay press or to a thresher, and it consists in the constructions, combinations and arrangements herein described and claimed.

The foremost object of my invention is to provide a self-acting feed mechanism either for hay presses or threshers, so arranged as to automatically take care of the material without supervision of an operator.

A further object of the invention is to provide an automatic feeder for hay presses and the like, embodying means for automatically regulating the feed.

A further object of the invention is to provide a novel self-feeding mechanism for hay presses and the like, for periodically dividing the hay or other material being fed, so as to deliver quantities of uniform proportions.

A further object of the invention is to provide in combination with the self feeder, an improved beater or plunger, which has a collapsible side to prevent sticking and damaging of the beater should a quantity of hay or other material become lodged in the throat on the downstroke.

Other objects and advantages will appear in the following specification, reference being had to the accompanying drawings, in which:—

Figure 1:
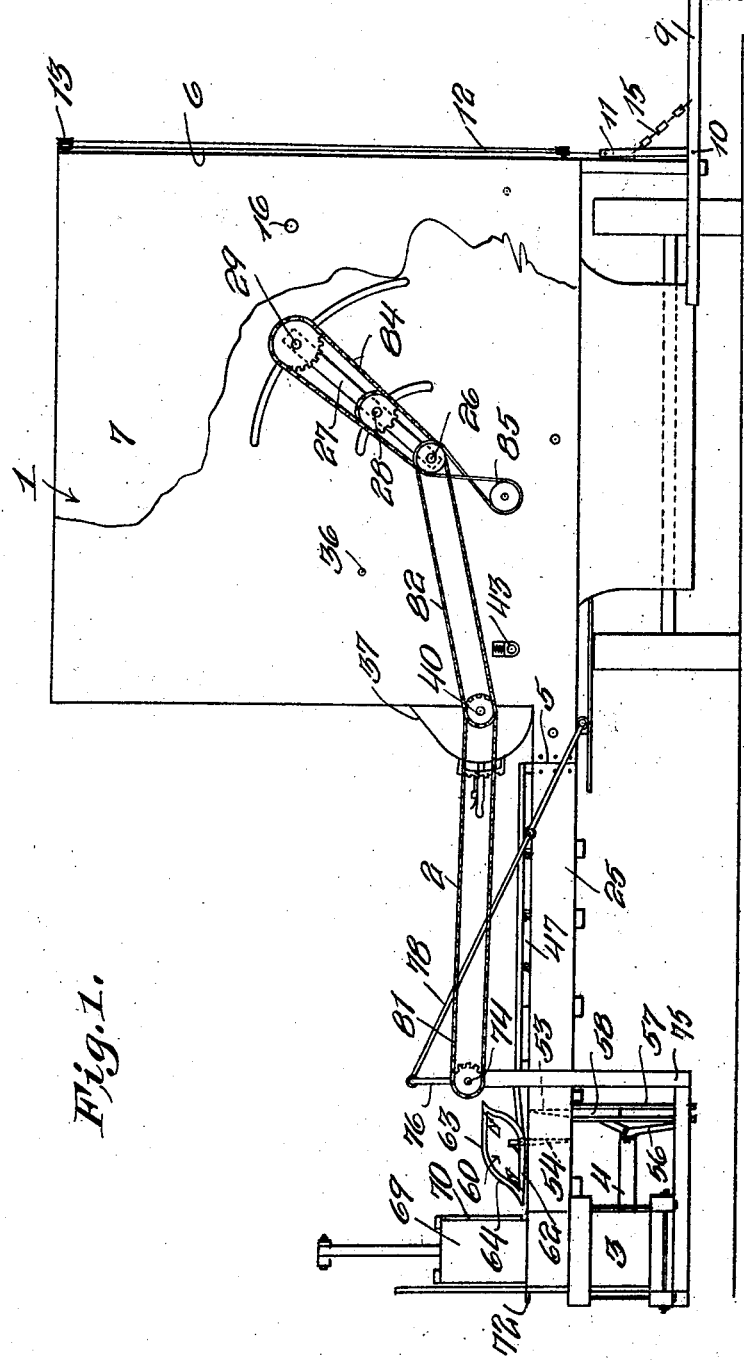

Figure 1 is a side elevation showing the general arrangement of the improved mechanism, this view showing the improved self feeder and bin operatively associated with a conventional form of hay press, Fig. 2 is a plan view of the mechanism illustrated in Fig. 1, Fig. 3 is a detail view of the improved self feeder, detached from the bin in Fig. 1, Fig. 4 is a detail sectional view of the bin which coöperates with the self feeder, Fig. 5 is a detail vertical cross section taken substantially on the line 5—5 of Fig. 3.

Figure 9:
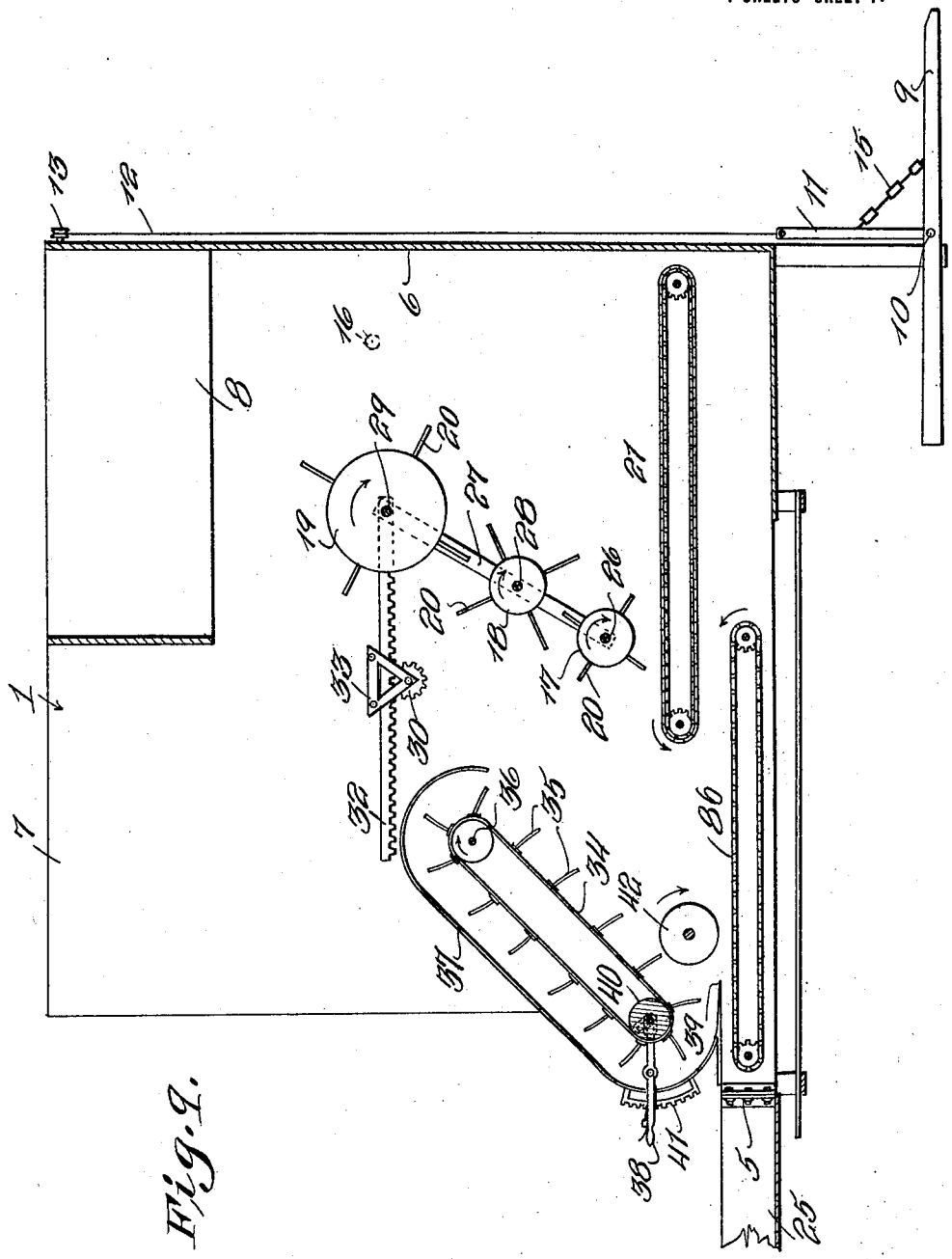

Fig. 6 is a detail perspective view illustrating the manner of mounting the collapsible teeth of one of the hay pusher rakes, Fig. 7 is a detail front elevation of the bin in Figs. 1 and 4, illustrating the tiltable loading rake, Fig. 8 is a detail perspective view of the reciprocating feed divider rake of the self feeder mechanism in Fig. 3, and Fig. 9 is a detail sectional view of the bin in Fig. 4, illustrating a slight modification which adapts the bin for use in connection with a threshing machine.

Generally speaking, the invention comprises the hay bin 1 and the self feeder 2, any ordinary type of hay press 3 being operatively associated with the latter, the only requirement making the hay press 3 adaptable being the provision of a cam 4, or any other equivalent suitable device, for actuating the feed divider mechanism of the self feeder. The hay bin 1 is detachable at 5 from the self feeder 2, so that the modified form thereof, illustrated in Fig. 9, may be connected with the self feeder in case the mechanism is intended to be used in connection with a thresher instead of with a hay press. Consider first

*The construction of the hay bin 1.*

In Figs. 4 and 7, the hay bin 1 is shown to be closed at the front 6 and sides 7, a hay chute 8 being defined in any suitable manner, for the purpose of receiving the hay as it is dumped thereinto by the tiltable loading rake 9. This rake is pivoted at 10 substantially in the middle, to a bracket structure 11, to which the hoisting cables 12 are joined; thereafter running over sheaves 13 at the top and over a single sheave 14 near the bottom so that the cable may be conveniently pulled by an operator.

Obviously if it be desired to hoist the loading rake 9 by means other than the efforts of an operator, the free end of the cable 12, shown in Fig. 7, may be suitably connected up to suit the purpose. Chains 15, or other flexible connections, support the load on the outer free end of the rake 9. Stops 16 at the sides of the bin 1 intercept the rearwardly extending portions of the rake 9 and cause the rake to discharge its load into the chute 8 by virtue of the rocking thereof on the pivot 10.

*The clearing mechanism* of the hay chute 8 comprises a plurality of drums respectively designated 17, 18 and 19. The first two are of substantially the same diameter but the upper drum 19 is considerably larger, all of the drums being provided with spikes or teeth 20, the purpose of which is to feed the hay downwardly in the chute 8 onto the rearwardly traveling conveyer 21. This conveyer practically forms the bottom of the chute 8, and as the hay is gathered thereon, it is moved rearwardly until it falls off upon the lower reciprocating pusher rake 22.

This rake comprises a plurality of collapsible teeth 23, which fall back into the position shown in Fig. 4 on the forward stroke, but rise into the erect position on the rearward stroke. By the latter act, the hay discharged on the rake is carried rearwardly, and naturally by falling over into the collapsed positions on the forward stroke, the teeth move beneath the mass of hay on the top to gather a new charge to be forced out of the throat 24 into the hay tunnel 25 of the self feeder 2.

Returning to the clearing mechanism, the shaft 26 of the lower drum 17, forms the pivotal mounting of the frame 27 in which the shafts 28, 29 of the remaining drums are journaled. The frame 27 is adjustable back and forth at various angles, the shaft 26 being the pivotal point, by means of a pinion 30 with a handle 31 on the outside. The pinion 30 meshes with the rack bar 32, which in turn is suitably connected to the frame 27 at the top. A triangular frame 33 forms the support both for the rack bar and pinion.

The feed regulator comprises a conveyer 34, with teeth 35, disposed at an angle in operative relationship to the discharge throat 24. The upper shaft 36, which is the driven shaft of the conveyer, is the pivotal point on which the conveyer and its housing 37 are movable by virtue of making adjustments with the handle 38.

The lower or entrance end of the housing 37 ends in a toothed cut-off edge 39 which is for the purpose of removing the surplus strata of hay from the mass moved forwardly toward the discharge throat 24 by the pusher rake 22, causing such surplus to be carried upwardly in the feed regulator housing 37 and again discharged on top of the mass adjacent to the discharge point of the conveyer 21. The surplus hay is thus kept in local circulation inside of the bin 1, until the mechanism adjusts itself so as to take care of the surplus and feed it in regular order to the hay press.

Any connection suitable for the purpose, may be employed between the handle 38 and the lower shaft 40 of the feed regulator conveyer, the principal requirement being the provision of means enabling movements in the respective directions of the handle and feed regulator. The adjustments are fixed by means of a quadrant 41, with which a suitable detent on the handle 38 coöperates.

Mounted near the entrance end of the feed regulator is a presser roller 42, which normally assumes the lowermost position shown by virtue of its own weight, but is pressed upwardly and aside against the tension of the spring 43, by the increasing quantity of hay beneath. The purpose of the presser roller 42 is to keep the hay from rising too high and consequently causing an undesirable quantity to enter the feed regulator at the cut-off 39.

The construction of the self feeder 2 in Figs. 1 and 3, comprises the hay tunnel 25, already mentioned, in which an upper pusher rake 44 operates. As stated before, the self feeder 2 is connected to the hay bin 1 at the point 5. This point of connection comprises a pair of angle irons 45, with alining apertures in which bolts are inserted to bolt the two parts together. These angle irons may be made either on the inside or outside.

As is the case of the rake 22 in Fig. 4, the pusher rake 44 in Fig. 3 has collapsible teeth 46, which assume the pendent positions, indicated in one instance in Fig. 3, on the rearward stroke, but collapse into the substantially horizontal positions on the forward stroke. By these actions the hay is moved rearwardly in the tunnel 25.

One of the teeth 46 is shown in detail in Fig. 6. Here, one bar 47 of a plurality of such rake bars, is shown to be provided with a divided casting 48, secured at 49 and provided with rear and front stops 50, 51, for limiting the corresponding movements of the tooth 46. The tooth itself is pivotally mounted as shown, and terminates at the other end in a short lug 52, which keeps the tooth from pulling out and also coöperates with a second front stop similar to the stop 51.

The feed dividing mechanism comprises a front rake stop 53 and a movable rear rake 54, these being respectively projectable into the hay tunnel 25 from the bottom and the top, to act upon the rearwardly moving mass of hay. As the plunger 55 of the hay press 3 makes an inward or compression stroke, the cam 4 carried thereby, acts on the toggle mechanism 56 of the front rake stop 53, to project the latter into the tunnel 25 from a normally retracted position beneath the bottom.

Suitable guides 57 receive the reciprocating members 58 by which the front rake stops 53 are carried. The head 59 of the lower toggle member 56, is T-shaped so that the toggle mechanism must follow the high and low portions of the cam 4 and consequently cause the projection and retraction of the front rake stop 53 according to the positions of the plunger 55.

Arranged in the proper operative position above the hay tunnel 25 adjacent to the discharge end thereof, is a feeder rake cam 60 of a peculiar construction. It is in the nature of a double track, the respective tracks being on the respective sides for the reception of the ends of the shaft 61 on which the rake teeth are mounted.

The cam 60 comprises horizontal track portions 62, 63 which merge with the curved portions 64, 65. Switches 66, 67 pressed by springs 68 into the normal closed positions are located at the extreme points of the cam 60 and prevent the ends of the shaft 61 from returning into the same horizontal cam portion after a stroke has been completed along that particular portion. In other words, the switches 66, 67 cause the shaft ends to move in a continuous path, and the shape of the cam itself causes the rear movable rake to perform a rearward stroke in the tunnel and the return stroke out of the tunnel.

It is by this means that quantities of hay are conveyed rearwardly by the successive rearward movements of the rake 54. Both rakes, namely, 53 and 54, enter the hay in the tunnel 25 at precisely the same moment. The front rake stop 53 remains stationary, after having been thrust in, but the rear rake 54 moves rearwardly to advance or discharge the quantity of hay thus divided off with the result that equal quantities of hay are regularly delivered to the hopper of the hay press 3.

Operating transversely to the hay press 3, is the reciprocating beater or presser 69, which is suitably actuated by means not disclosed, and includes a movable side 70. This movable side is normally pressed outwardly by one or more springs 71, the purpose of this movable and resiliently mounted side being to prevent mutilation of the feeder in case a quantity of hay should become lodged between the lower edge of the discharge throat of the tunnel 25 and the adjacent edge of the feeder. In such case, the side 70 gives inwardly to overcome the obstruction. It should also be mentioned and observed that the movable rear rake 54 includes a rectangular guide frame 72 which includes suitable braces 73 to the rake structure. While performing the offices of a guide for the rake 54, the rectangular frame 72 also permits the reciprocating beater 69 to work up and down without interfering with the movements of the rake.

*The drive mechanism* comprises a crank shaft 74, journaled in standards 75 and including cranks 76, 77 by means of which the rakes 22, 44 and 54 are reciprocated through pitman connections 78, 79. The crank shaft is driven through sprocket and chain connections 80 at one end, and serves to drive the lower feed regulator shaft 40 by sprocket and chain connections 81 at the other end.

A chain 82 drives the lower pivotal shaft 26 from the shaft 40, and a chain 83 drives the intermediate drum 18 from the shaft 26. Similarly, the upper drum 19 is driven by a chain 84 applied to a sprocket on the intermediate shaft. The conveyer 21 is driven by a crossed belt 85, which is applied to pulleys on the adjacent conveyer and clearing drum shafts.

The operation may be briefly reviewed to advantage. Hay, or other material to be baled, is loaded onto the rake 9 while it is in the lowermost position in Fig. 4. When a load of a suitable size has been accumulated on the rake, the cable 12 is pulled until the rear ends of the rake strike the stops 16, causing the rake to tilt and dump the load into the chute 8 wherein the drums 17, 18 and 19 revolve to clear the chute by feeding the hay rearwardly in the direction of discharge of the bottom conveyer 21.

The crank shaft 74 being continuously rotatable causes the rake 22 and 44 to reciprocate by virtue of the pitman 78, thus moving the hay toward the discharge throat 24 and the hay press. Each time the plunger 55 of the hay press makes an inward or compression stroke, the cam 4 carried thereby, moves the toggle mechanism 56 outwardly and causes the normally retracted front rake stop 53 to be projected into the hay tunnel 25 and across the moving mass of hay. Simultaneously with the projection of the front rake stop 53, the movable rear rake 54 is plunged into the hay from above and in continuing its motion, which is now rearward, in the hay tunnel 25, causes the hay thus divided off to be forwarded to the hopper of the hay press where it is pressed down into position by the reciprocating beater or plunger 69.

Adjustment of the quantity of hay discharged at the throat 24 of the hay bin 1, is effected by moving the handle 38 over the quadrant 41, by which means the lower end of the feed regulator is moved up or down to place the cut-off 39 in the desired position. Obviously, if the cut-off 39 is in the lowermost position, the quantity of hay discharged will be minimum, the surplus being directed upwardly in the housing 37 by the moving conveyer 34 to be returned on top of the mass of hay adjacent to the discharge end of the conveyer 21. As stated before, the surplus hay is thus kept in local circulation until the general mass of hay has been so disposed of by the mechanism as to cause the surplus to go forwardly for compression in the hay press 3. The various adjustments capable of being effected by means of the pinion 30 and rack 32 do not require repetition, the sole purpose thereof being to incline the frame 27 at more or less of an angle.

*The modification in Fig. 9* is the same in construction as the hay bin 1 in Fig. 4, with the exception that a conveyer 86 is substituted for the lower pusher rake 22. This construction of bin is adapted to handling wheat or other grain for feeding the same to a thresher. Otherwise, the other structure in Fig. 9 is the same as that in Fig. 4 and indicated by similar reference characters referring to the same parts.

While the construction and arrangement of the improved self feeder as herein described and claimed, is that of a generally preferred form, obviously modifications and changes can be made without departing from the spirit of the invention or the scope of the claims.

I claim:—

1. A self feeder, comprising means for receiving the material, means for rearwarding it, and means for sub-dividing the material, comprising material stopping means with an associated movable member for pushing the divided section out.

2. A self feeder comprising means for receiving the material, means for rearwarding it, and sub-dividing means, comprising automatically press-operated stop means projectable into the material, and an operatively associated movable member retrogrant from said stop means to carry out the sub-divided quantity.

3. A self feeder for hay presses, comprising means for receiving the hay, means for rearwarding it, and means for sub-dividing quantities for periodic introduction into the hay press, comprising an automatically pressed plunger-operated stop member projectable to a dormant position across the hay, and a retrograntly movable member simultaneously projectable into the hay to carry out the sub-divided quantity into the hay press.

4. A self feeder, comprising means for receiving the material, material rearwarding means, operatively associated means for handling the surplus above a pre-adjusted quantity, and material-dividing means simultaneously projectable across, comprising an automatically actuated stop member for temporarily stemming the oncoming mass, and a member retrograntly movable from said stop member to discharge the sub-divided quantity.

5. A self feeder, comprising a receiving bin, moving means for carrying the material rearwardly, and means for adjustably governing the quantity of material discharged from the bin.

6. A self feeder, comprising a receiving bin, moving means for carrying the material rearwardly, cut-off means operatively associated with the discharge throat of the bin for producing a local circulation of surplus material, and means for adjusting said cut-off means.

7. A self feeder, comprising a receiving bin, moving means for carrying the material rearwardly, cut-off means operatively associated with the discharge throat of the bin for producing a local circulation of surplus material, and means for varying the zone of operation of said cut-off means.

8. A self feeder, comprising a receiving bin, means for moving the material toward a discharge throat, and means adjustably operatively associated with said throat for keeping the discharge to a desired quantity, said means including cut-off means with an operatively associated conveyer for producing a local circulation of material.

9. A self feeder, comprising a receiving bin, means for moving the material toward a discharge throat, means adjustably operatively associated with said throat for keeping the discharge to a desired quantity, said means including cut-off teeth with an operatively associated conveyer for producing a local circulation, and presser means operatively associated with said cut-off teeth and conveyer.

10. A self feeder, comprising a receiving bin, means for raising and automatically dumping a load of material into the bin, a movable bottom, movable steering means coöperating with the bottom, reciprocating means for rearwarding the material from said bottom to a discharge throat, and feed discharge regulator means coöperating with said throat, including a moving member for producing a local circulation of material, with a housing having cut-off means forming the top of said throat.

11. A self feeder, comprising a bin with a receiving chute and a discharge throat, means for automatically dumping a load of material into the chute, a movable bottom for supporting the material, adjustable coöperating chute steering means, reciprocating rearwarding means including material engaging means retrovertible on the forward stroke, yieldably mounted presser means, and speed regulator means, comprising a forwardly inclined circulation-producing conveyer, with a housing having cut-off means adjacent to the throat, and means for moving said parts on an upper pivotal axis.

12. A self feeder, comprising a receiving bin with a chute having a continuously movable bottom, means for elevating and automatically dumping a load of material into the chute, chute clearing means comprising a plurality of revolving spiked drums, in a frame having adjusting means therefor; a reciprocating rake with teeth collapsible on the forward stroke, yieldable presser means bearing on the material above the rake, and feed regulator means, comprising an inclined housing with cut-off teeth above the rake, a conveyer in the housing for producing a local circulation of surplus material, and means for adjusting the lower end of the housing and conveyer.

13. A self feeder, comprising a receiving bin with a chute and discharge throat, material elevating means comprising a tiltable rake, cable-hoisted and engageable with stops to dump the load into the chute; an endless movable bottom, chute clearing means comprising a pivoted frame with a rack and pinion adjustment at the top, and a plurality of revolving spiked drums; a reciprocating rake with teeth collapsible on the forward stroke, a yieldably mounted presser roller above the rake, and feed regulator means, comprising an inclined conveyer, with a housing terminating at the lower end in cut-off teeth for removing surplus material and establishing a local circulation at the adjacent discharge throat, and means for adjusting the housing up and down.

14. A self feeder, comprising a tunnel, means for moving material in one direction therein, normally retracted stop means periodically projected across to periodically stem the moving mass, and continuously moving means simultaneously projectable across to discharge the sub-divided material portion in a retrograde path of movement.

15. A self feeder, comprising a tunnel, means for moving material in one direction therein, normally retracted stop means periodically projected across to periodically stem the moving mass, continuously moving means simultaneously projectable across to discharge the sub-divided material portion in a retrograde path of movement, and means for thereafter retracting said means at the end of the retrograde movement, to traverse another path to repeat the projecting act.

16. A self feeder, comprising a tunnel leading to an operatively associated material press, reciprocating means for moving the material in one direction toward the press, normally retracted stop means automatically projected across the tunnel by the plunger of the press to temporarily stem the mass, continuously movable means simultaneously projected across to discharge the sub-divided material portion into the press, during its retrograde movement in the tunnel, a cam shaped to retract said means at the end of said movement and to return said means to the projecting position exteriorly of the tunnel, and suitable switch means operating to prevent said means from moving backwardly along any path.

17. A self feeder, comprising a tunnel with means for moving material in one direction, material dividing means comprising a stop member projectable across the tunnel to stem the moving mass, means simultaneously projectable across in substantially the same plane, means for continuously keeping said means in motion to discharge the sub-divided material during a retrograde portion of the movement, a suitably formed cam for retracting said means from the tunnel at the end of said movement, and returning it to the initial projecting position and switch means operating to keep said means moving in a given path.

18. The combination, of a press, a material tunnel discharging thereinto, and means periodically actuated by the plunger for stopping the moving material in the tunnel.

19. The combination, of a press, a material tunnel discharging thereinto, means periodically actuated by the plunger for stopping the moving material in the tunnel, and coöperating moving means for discharging into the press that portion of the material behind the aforesaid stopping means.

20. The combination, of a press, a material tunnel discharging thereinto, means periodically actuated by the plunger for stopping the moving material in the tunnel, coöperating moving means for discharging into the press that portion of the material behind the aforesaid stopping means, and means for packing the material into the press.

21. The combination, of a press, a material tunnel discharging thereinto, means periodically actuated by the plunger for stopping the moving material in the tunnel, coöperating moving means for discharging into the press that portion of the material behind the aforesaid stopping means, means for packing the material into the press, and resiliently mounted means embodied in said packing means enabling yielding thereof if an obstruction be encountered.

22. In combination with a hay press plunger, a hay tunnel discharging ahead of the plunger, a normally retracted stop with toggle and guide means, and a cam carried by the plunger and operatively associated with the toggle means, for projecting the stop across the tunnel on the inward stroke of the plunger to temporarily stem the moving hay.

23. In combination with a hay press plunger, a hay tunnel discharging ahead of the plunger, a normally retracted stop with toggle and guide means, a cam carried by the plunger and operatively associated with the toggle means, for projecting the stop across the tunnel on the inward stroke of the plunger to temporarily stem the moving hay, and a continuously moving rake simultaneously projectable into the tunnel to discharge the sub-divided quantity during a retrograde movement.

24. In combination with a hay press plunger, a hay tunnel discharging ahead of the plunger, a normally retracted stop with toggle and guide means, a cam carried by the plunger and operatively associated with the toggle means, for projecting the stop across the tunnel on the inward stroke of the plunger to temporarily stem the moving hay, a continuously moving rake simultaneously projectable into the tunnel to discharge the sub-divided quantity during a retrograde movement, and an operatively associated cam for retracting said moving means and returning it to the projecting position exteriorly of said tunnel.

25. The combination in a self feeder, of a hay tunnel, a continuously moving hay rearwarding rake, and a cam structure arranged to guide the rake on a rearward stroke in the tunnel but return it for a repetition of the stroke out of the tunnel.

26. The combination in a self feeder, of a hay tunnel, a cam structure including parallel tracks, and curved portions joining the tracks, and a hay rearwarding rake guided by the cam, performing a rearward stroke in the tunnel along one of the tracks, and performing the return stroke on the other of the tracks outside of the tunnel.

27. The combination in a self feeder, of a hay tunnel, a cam structure including parallel tracks, and curved portions joining the tracks, a hay rearwarding rake guided by the cam, performing a rearward stroke in the tunnel along one of the tracks, and performing the return stroke on the other of the tracks outside of the tunnel, and suitably disposed switches arranged on the cam to keep the rake from moving backwardly along said tracks.

28. The combination in a self feeder, of a hay tunnel, a rake for rearwarding the hay toward the discharge throat by a movement in the tunnel and making a return stroke for a repetition of the movement, out of the tunnel; and guiding structure for the rake against which the teeth are braced.

29. The combination in a self feeder, of a hay tunnel, a rake for rearwarding the hay toward the discharge throat by a movement in the tunnel and making a return stroke for a repetition of the movement, out of the tunnel; an open guide for the rake against which the teeth are braced, and a hay beater operating transversely of the discharge throat and in the open guide.

30. The combination in a self feeder, of a hay tunnel, a rake for rearwarding the hay toward the discharge throat by a movement in the tunnel and making a return stroke for a repetition of the movement, out of the tunnel; an open guide for the rake against which the teeth are braced, a hay beater operating transversely of the discharge throat and in the open guide, and a resiliently mounted side embodied in the beater, compensating for obstructions.

31. In combination with a hay press, a receiving bin with hay rearwarding means, feed control means for producing a local circulation of surplus hay, a self feeder connected to the bin, with rearwarding means; hay divider means comprising an intermittently projectable stop for stemming the moving hay, and a continuously moving rearwarding rake for discharging the sub-divided portion into the recess and performing a return stroke outside of the self feeder; means automatically actuated by the plunger of the hay press for controlling said stop, and continuously moving drive means for actuating all rearwarding means, the feed control means and the aforesaid rake.

EDWIN O. STANCLIFF.